(12) United States Patent
Selle (10) Patent No.: US 8,485,910 B2
(45) Date of Patent: Jul. 16, 2013

(54) SEALED END T-NUT

(75) Inventor: Stephen Selle, Mentor, OH (US)

(73) Assignee: Stafast Products, Inc., Painesville, OH (US)

( * ) Notice: Subject to any disclaimer, the term of this patent is extended or adjusted under 35 U.S.C. 154(b) by 846 days.

(21) Appl. No.: 12/329,601

(22) Filed: Dec. 7, 2008

(65) Prior Publication Data

US 2010/0041486 A1     Feb. 18, 2010

Related U.S. Application Data

(60) Provisional application No. 61/089,859, filed on Aug. 18, 2008.

(51) Int. Cl.
*B21G 5/00*     (2006.01)
*B21D 53/24*     (2006.01)
*B21K 1/64*     (2006.01)
*F16B 37/04*     (2006.01)
*A47G 3/00*     (2006.01)

(52) U.S. Cl.
USPC .................. 470/5; 470/19; 470/22; 411/177; 411/376

(58) Field of Classification Search
USPC .................. 470/20–22, 2–7, 19, 25; 411/177, 411/376
See application file for complete search history.

(56) References Cited

U.S. PATENT DOCUMENTS

| | | | |
|---|---|---|---|
| 180,064 A | 7/1876 | Rebasz | |
| 244,379 A | 7/1881 | Coulter et al. | |
| 397,988 A | 2/1889 | Kimball | |
| 596,948 A | 1/1898 | Seely | |
| 797,545 A | 8/1905 | Reed | |
| 812,294 A | 2/1906 | Ette | |
| 1,112,525 A | 10/1914 | Darling | |
| 1,773,146 A | 8/1930 | Kellogg | |
| 1,881,836 A | 10/1932 | Mitchell | |
| 1,893,067 A | 1/1933 | Arenz | |
| 1,919,728 A | 7/1933 | Kellogg | |
| 2,026,757 A | 1/1936 | Swanstrom | |
| 2,049,104 A | 7/1936 | Charlton | |
| 2,321,497 A | 8/1939 | Luce | |

(Continued)

FOREIGN PATENT DOCUMENTS

JP     2000-257619     9/2000

OTHER PUBLICATIONS

Groover, Mikell, Fundamentals of Modern Manufacturing, 2002, John Wiley & Sons, 2nd Edition, p. 703.*

*Primary Examiner* — Dana Ross
*Assistant Examiner* — Mohammad I Yusuf
(74) *Attorney, Agent, or Firm* — Woodling, Krost and Rust (57) ABSTRACT

A fastener includes a t-nut having a barrel and a flange. The flange includes an opening which leads to a threaded barrel. The threaded barrel extends from the opening in the flange to a distal end portion thereof. An end cap has an annular recess on a first side thereof and has a raised annular ridge on a second side thereof. The raised annular ridge of the end cap is affixed to the flange of the t-nut by welding the end cap to the flange. Dirt, water and moisture cannot enter the barrel because the end cap is sealed to the flange. Additionally, the barrel may be relatively short as it is fully threaded prior to the affixation of the end cap to the flange.

11 Claims, 12 Drawing Sheets

U.S. PATENT DOCUMENTS

| | | | |
|---|---|---|---|
| 2,202,405 A * | 5/1940 | Smith | 219/107 |
| 2,208,779 A | 7/1940 | Tinnerman | |
| 2,267,379 A | 12/1941 | Tinnerman | |
| 2,314,756 A | 3/1943 | Bedford, Jr. | |
| 2,321,201 A * | 6/1943 | Heilman | 411/171 |
| 2,343,947 A | 3/1944 | Auslander | |
| 2,381,936 A | 8/1945 | Sargent | |
| 2,383,141 A | 8/1945 | Maage | |
| 2,477,430 A | 7/1949 | Swanstrom | |
| 2,685,721 A | 8/1954 | Eves | |
| 2,909,206 A * | 10/1959 | Johnson | 411/171 |
| 2,936,668 A | 5/1960 | Meyer | |
| 2,968,206 A | 1/1961 | Bunnosuke | |
| 3,004,784 A | 10/1961 | Selby | |
| 3,037,596 A | 6/1962 | Fordyce | |
| 3,050,097 A | 8/1962 | Cochran | |
| 3,146,656 A | 9/1964 | Richards | |
| 3,234,612 A | 2/1966 | Raymond | |
| 3,235,917 A | 2/1966 | Skubic | |
| 3,270,610 A * | 9/1966 | Knowlton | 411/427 |
| 3,289,724 A | 12/1966 | Ernest | |
| 3,319,509 A | 5/1967 | Constantino | |
| 3,353,580 A | 11/1967 | Benjamin | |
| 3,358,727 A | 12/1967 | Hughes | |
| 3,403,218 A | 9/1968 | Norden | |
| 3,461,936 A | 8/1969 | Rosan, Sr. | |
| 3,505,636 A | 4/1970 | McDowell | |
| 3,646,982 A | 3/1972 | Cushman | |
| 3,704,507 A | 12/1972 | Grube | |
| 3,809,139 A | 5/1974 | Strain | |
| 3,845,860 A | 11/1974 | Ladouceur et al. | |
| 3,878,599 A | 4/1975 | Ladouceur et al. | |
| 3,900,967 A | 8/1975 | Bursk et al. | |
| 3,920,059 A | 11/1975 | Grube | |
| 3,926,236 A | 12/1975 | Pouch et al. | |
| 3,962,828 A | 6/1976 | McAllister | |
| 3,967,412 A | 7/1976 | Governale | |
| 3,983,388 A | 9/1976 | Gugliotta | |
| 4,018,257 A | 4/1977 | Jack | |
| 4,074,464 A | 2/1978 | McCay | |
| 4,172,523 A | 10/1979 | Weglage | |
| 4,266,460 A * | 5/1981 | Klimowicz | 411/397 |
| 4,279,341 A | 7/1981 | Pleickhardt | |
| 4,306,654 A | 12/1981 | Grube | |
| 4,352,258 A | 10/1982 | Bursk | |
| 4,376,334 A | 3/1983 | Miller | |
| 4,377,360 A | 3/1983 | Kennedy | |
| 4,379,537 A | 4/1983 | Perrault et al. | |
| 4,387,535 A | 6/1983 | Corbo | |
| 4,447,987 A | 5/1984 | Lesosky | |
| 4,476,653 A | 10/1984 | Speer | |
| 4,508,478 A | 4/1985 | Leistner | |
| 4,580,322 A | 4/1986 | Wright | |
| 4,595,325 A | 6/1986 | Moran | |
| 4,768,907 A | 9/1988 | Gauron | |
| 4,770,275 A | 9/1988 | Williams | |
| 4,790,701 A | 12/1988 | Baubles | |
| 4,860,513 A | 8/1989 | Whitman | |
| 4,903,831 A | 2/1990 | Francis | |
| 4,913,609 A | 4/1990 | Mauer | |
| 4,945,680 A | 8/1990 | Giguere | |
| 4,961,553 A | 10/1990 | Todd | |
| 4,971,499 A | 11/1990 | Ladouceur | |
| 4,991,365 A | 2/1991 | Jackson | |
| 5,010,690 A | 4/1991 | Geoffrey | |
| 5,078,537 A | 1/1992 | Nomura | |
| 5,096,350 A | 3/1992 | Peterson | |
| 5,108,238 A | 4/1992 | Ewing | |
| 5,114,014 A | 5/1992 | Ascalon et al. | |
| 5,136,814 A | 8/1992 | Headrick | |
| 5,138,814 A | 8/1992 | Giles et al. | |
| 5,152,582 A | 10/1992 | Magnuson | |
| 5,179,804 A | 1/1993 | Young | |
| 5,195,854 A | 3/1993 | Nagayama | |
| 5,199,836 A | 4/1993 | Gogarty | |
| 5,205,092 A | 4/1993 | Taylor | |
| 5,214,843 A | 6/1993 | Bromley et al. | |
| 5,230,181 A | 7/1993 | Geoffrey | |
| 5,238,344 A | 8/1993 | Nagayama | |
| 5,239,728 A | 8/1993 | Redman | |
| 5,244,326 A | 9/1993 | Henriksen | |
| 5,273,351 A | 12/1993 | Rubel | |
| 5,290,131 A * | 3/1994 | Henriksen | 411/180 |
| 5,297,851 A | 3/1994 | Van Hekken | |
| 5,299,686 A | 4/1994 | Bromley et al. | |
| 5,314,427 A | 5/1994 | Goble et al. | |
| 5,327,645 A | 7/1994 | Bromley et al. | |
| 5,348,432 A * | 9/1994 | Nagayama | 411/183 |
| 5,388,940 A | 2/1995 | Herren | |
| 5,391,031 A | 2/1995 | Medal | |
| 5,423,645 A | 6/1995 | Muller et al. | |
| 5,426,894 A | 6/1995 | Headrick | |
| 5,429,466 A | 7/1995 | Nagayama | |
| 5,445,483 A | 8/1995 | Fultz | |
| 5,489,173 A | 2/1996 | Hofle | |
| 5,501,558 A | 3/1996 | Figge | |
| 5,503,596 A | 4/1996 | Nagayama | |
| 5,517,788 A | 5/1996 | McGough | |
| 5,524,391 A | 6/1996 | Joffe | |
| 5,564,873 A | 10/1996 | Ladouceur et al. | |
| 5,588,266 A | 12/1996 | Headrick | |
| 5,611,173 A | 3/1997 | Headrick | |
| 5,618,144 A | 4/1997 | Leistner | |
| 5,624,217 A | 4/1997 | Hungerford | |
| 5,638,641 A | 6/1997 | Joffe et al. | |
| 5,722,131 A | 3/1998 | Leistner | |
| 5,762,190 A | 6/1998 | Leistner | |
| 5,863,164 A | 1/1999 | Leistner | |
| 5,879,119 A | 3/1999 | Robinson | |
| 5,893,538 A | 4/1999 | Onishi et al. | |
| 5,904,461 A | 5/1999 | McKarge | |
| 5,918,738 A | 7/1999 | Leistner | |
| 5,993,320 A | 11/1999 | Selle | |
| 6,071,052 A | 6/2000 | Kerr | |
| 6,095,738 A | 8/2000 | Selle | |
| 6,109,849 A | 8/2000 | Nagayama | |
| 6,129,431 A | 10/2000 | Hansen, Jr. et al. | |
| 6,129,493 A | 10/2000 | Leistner | |
| 6,131,347 A | 10/2000 | Hornberger et al. | |
| 6,174,117 B1 | 1/2001 | Kawatani et al. | |
| 6,183,181 B1 * | 2/2001 | Leistner et al. | 411/177 |
| 6,185,870 B1 | 2/2001 | Mettler | |
| 6,203,231 B1 | 3/2001 | Salice | |
| 6,209,722 B1 | 4/2001 | Leistner | |
| 6,272,814 B1 | 8/2001 | Ikuta et al. | |
| 6,305,888 B1 | 10/2001 | Leistner | |
| 6,345,477 B1 | 2/2002 | Kepler et al. | |
| 6,349,907 B1 | 2/2002 | Hollington et al. | |
| 6,407,351 B1 | 6/2002 | Meyer | |
| 6,550,999 B2 | 4/2003 | Petit et al. | |
| 6,637,994 B2 | 10/2003 | Leistner | |
| 6,640,968 B2 | 11/2003 | Selle | |
| 6,701,570 B2 | 3/2004 | Henriott et al. | |
| 6,832,696 B2 | 12/2004 | Donnor | |
| 6,854,943 B2 | 2/2005 | Nagayama | |
| 7,021,221 B2 | 4/2006 | Del Frari | |
| 7,287,732 B2 | 10/2007 | Balistreri | |
| 7,427,180 B2 | 9/2008 | Ladoucer et al. | |
| 7,484,700 B2 | 2/2009 | Selle | |
| 7,524,129 B2 | 4/2009 | Selle | |
| 7,540,699 B2 | 6/2009 | Selle | |
| 7,674,081 B2 | 3/2010 | Selle | |
| 2003/0035700 A1 | 2/2003 | Chiang | |
| 2004/0234356 A1 | 11/2004 | Parker et al. | |
| 2008/0069660 A1 | 3/2008 | Selle | |
| 2008/0193254 A1 | 8/2008 | Selle | |

* cited by examiner

SEALED END T-NUT

This application claims priority to U.S. provisional patent application Ser. No. 61/089,859 filed Aug. 18, 2008.

FIELD OF THE INVENTION

The invention is the field of closed-end fasteners.

BACKGROUND OF THE INVENTION

Presently in the field there are several different ways that closed end fasteners are used and are manufactured.

Typical applications are molding applications where the closed end is used to prevent plastic from flowing into the back side of a fastener which would fill and render the threads on the fastener un-usable. Closed end fasteners are also used in tank (fluid container) type applications to prevent fluid from escaping the tank yet provide an external attachment point for the tank. Finally, closed end fasteners are commonly used in snow board applications where the closed end is used to prevent epoxy resins from flowing into the part and filling the threads with plastics.

Presently the market place use different types of closed end fasteners. Screw machine inserts are turned to shape and may be made out of brass and sometimes steel and aluminum. The most common shape of the insert is the hex shape shown in FIGS. 1 and 1A. A drawback with brass inserts is high cost due to manufacturing time and material costs.

Figure 1:
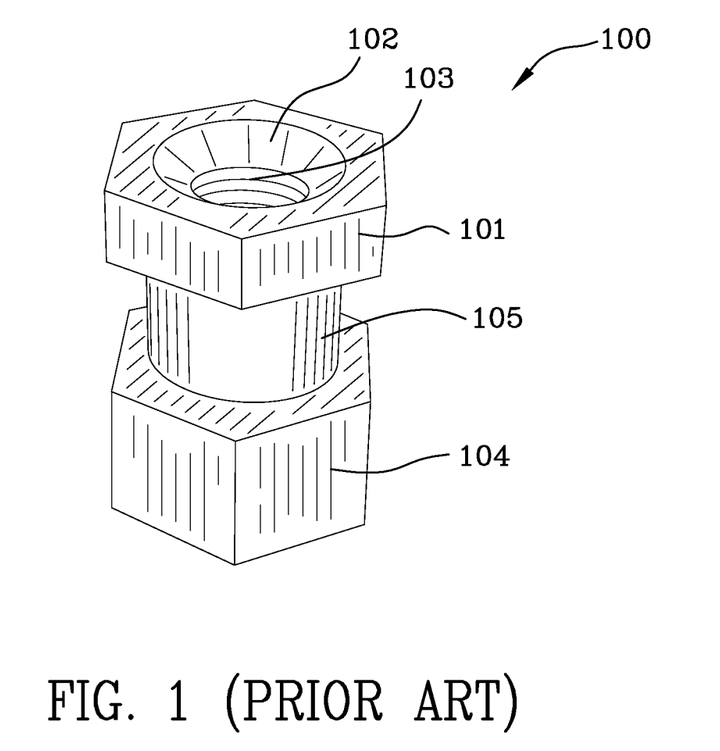
FIG. 1 is a screw machine brass insert.
Figure 1A:
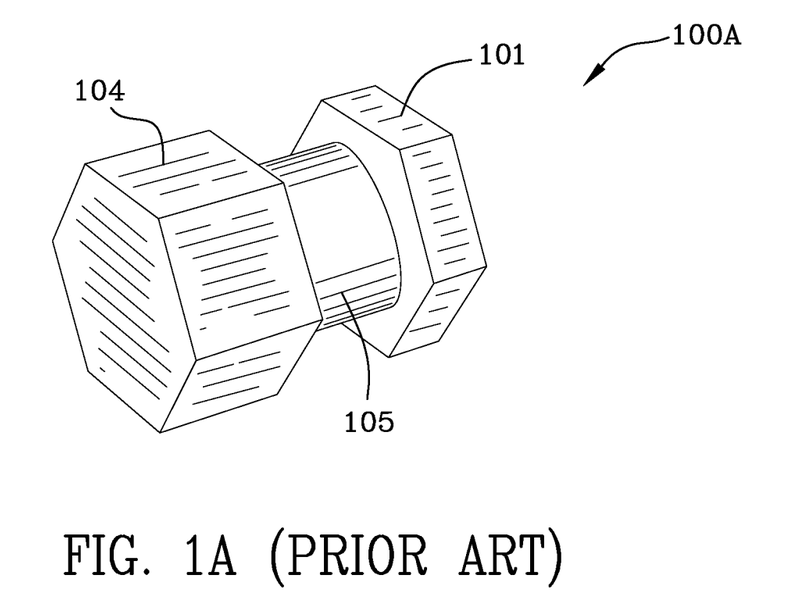
FIG. 1A is another view of the screw machine brass insert.

FIG. 1 is a view 100 of the prior art screw machine brass insert. FIG. 1A is another view 100A of the prior art screw machine brass insert resting on one of the hexagonal sides. Hexagonal head 101 of the prior art screw machine brass insert includes a tapered recess 102 leading to the threads 103 of the prior art screw machine insert. Inner threads 103 of the prior art screw machine brass insert are illustrated in FIGS. 1 and 1A. Threads 103 do not extend through the insert as illustrated in FIG. 1A. Since the threads cannot extend through the insert a longer insert must be used to obtain the required thread depth. Larger hexagonal head 104 of the prior art screw machine brass insert is illustrated in FIGS. 1 and 1A. Reference numeral 105 is the shank of the prior art screw machine brass insert.

Figure 2:
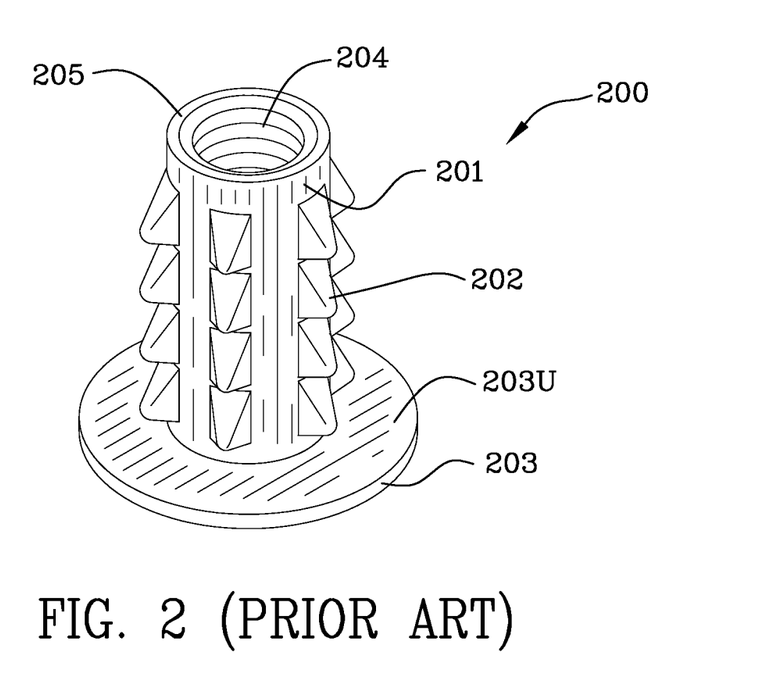
FIG. 2 is a zinc die cast insert.
Figure 2A:
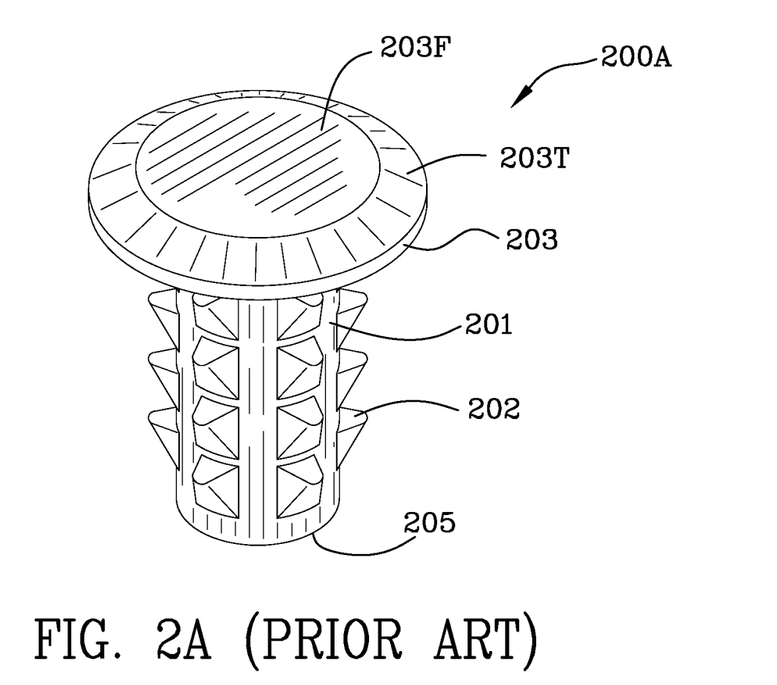
FIG. 2A is another view of the zinc die cast insert.

FIG. 2 is a view 200 of the zinc die cast insert resting on flange 203F. FIG. 2A is another view 200A of the prior art zinc die cast insert shown resting on shank or barrel 201. Zinc die cast inserts are molded to shape from a zinc alloy. Zinc die cast inserts are cost prohibitive due to the cost of the molds. Further, there is considerable difficulty in plating zinc and zinc alloys to provide good corrosion resistance and lack of strength of the zinc alloys.

Still referring to FIGS. 2 and 2A, barbs or prongs 202 are illustrated protruding from shank 201. Shank 201 terminates in end portion 205. Flange 203F tapers 203T to edge 203. Reference numeral 203U denotes the underside of the flange. Inner threads 204 are illustrated in FIG. 2.

Cold headed steel parts are formed to shape then tapped. Issues with cold headed steel parts include the cost to manufacture and limitations on shapes that this manufacturing process can generate to fit different applications.

All three of these manufacturing methods have one other serious drawback. The amount of thread that can be tapped in a blind hole is limited. The hole cannot pierce through the back side of the part because it is closed and the tap must be stopped prior to bottoming out in the hole and breaking the tap in manufacturing. Due to these limitations, the length of the part must be increased to obtain the depth (amount) of thread desired.

SUMMARY OF THE INVENTION

A fastener includes a t-nut having a barrel and a flange. The flange includes an opening which leads to a threaded barrel. The threaded barrel extends from the opening in the flange to a distal end portion thereof. An end cap has an annular recess on a first side thereof and has a raised annular ridge on a second side thereof. The t-nut and the end cap may be made of steel or stainless steel. The raised annular ridge of the end cap is affixed to the flange of the t-nut by resistance welding the end cap to the flange. Dirt, water and moisture cannot enter the barrel because the end cap is sealed to the flange. Additionally, the barrel may be relatively short as it is fully threaded prior to the affixation of the end cap to the flange.

One example of the invention is a closed end t-nut with a sealing cap. The t-nut addresses the issues raised by current prior art manufacturing options. The method of manufacturing is to form a t-nut and then to tap its thread all the way through the part. Then in a separate operation, weld cap (end cap) is formed which has a circular (annular) raised weld ring. The end cap is then centered on the back of the flange of the t-nut and the raised weld ring is resistance welded to the flange of the t-nut. A seal is formed 360 degrees around the cap where it is welded to the flange of the t-nut thus preventing fluids from entering the part from the flange side of the t-nut. The resistance welding includes forcefully, under pressure, applying electrodes to the t-nut and the end cap bringing them into inter-engagement with each other and then passing electric current through the t-nut and end cap. The current is concentrated in the raised lip of the end cap heating and melting the raised ridge of the end cap and the flange together.

The advantages of this manufacturing method include a part fully threaded all the way to the cap. In other words, the thread is fully formed from near the flange end of the T-Nut to the end of the barrel. In this way, a short fastener is formed which functions as if it were a longer fastener. The manufacturing method for the short fastener of this invention is highly automated and per part cycle times are low. The fastener can be made from steel with a wide range of platings or even stainless steel for corrosion resistance. The fastener will be competitive from a manufactured cost standpoint. The fastener can be made in a wide variety of thread sizes, barrel lengths and flange diameters. The flange provides excellent pull out resistance in molding applications.

The round base part can be easily configured into a wide range of shapes. Final configurations for the sealed end T-nut include an upset hex form for plastic molding applications, a 4-prong configuration for snow boards, a propel nut for plastic applications, and a hopper feed configuration for automation into seating components where adhesive is sprayed onto the seat which holds the foam in place.

A process for making the fastener comprises the steps of: forming a t-nut having a barrel and a flange, said flange includes an opening, said barrel extending from said opening in said flange to a distal end portion; forming interior threads in said barrel; forming an end cap having an annular recess on a first side thereof and having a raised annular ridge on a second side thereof; and, resistance welding said raised annular ridge of said end cap to said flange of said t-nut. The t-nut may optionally be an upset hex t-nut, a four-prong t-nut, a propel nut, or a hopper feed t-nut.

A fastener, comprising, a t-nut having a barrel and a flange, said flange includes an opening, said barrel extending from said opening in said flange to a distal end portion; interior threads in said barrel; an end cap having an annular recess in a first side thereof and having a raised annular ridge on a second side thereof; and, said raised annular ridge of said end cap affixed to said flange of said t-nut is disclosed and claimed. The t-nut may be an upset hex t-nut, a four-prong t-nut, a propel nut, or a hopper feed t-nut.

It is an object of the present invention to provide a sealed end t-nut which includes threads which extend from the flange to the open end of the barrel.

DESCRIPTION OF THE INVENTION

Figure 3:
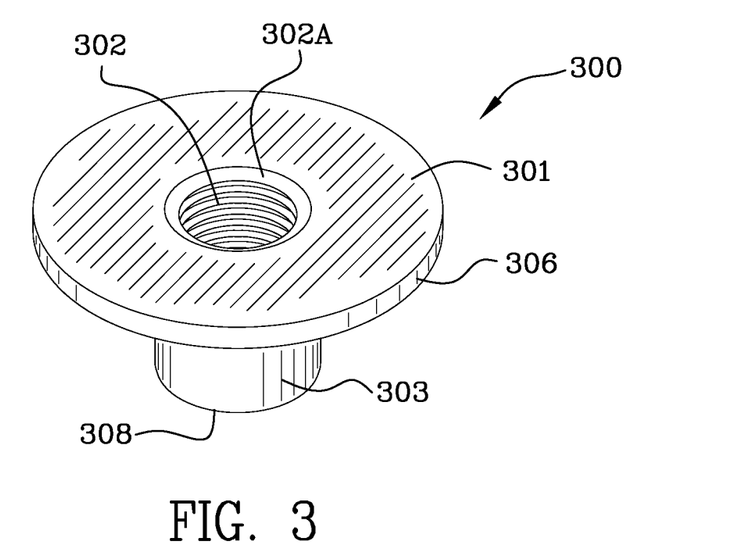
FIG. 3 is a top perspective view of a t-nut threaded completely through the part.
Figure 3A:
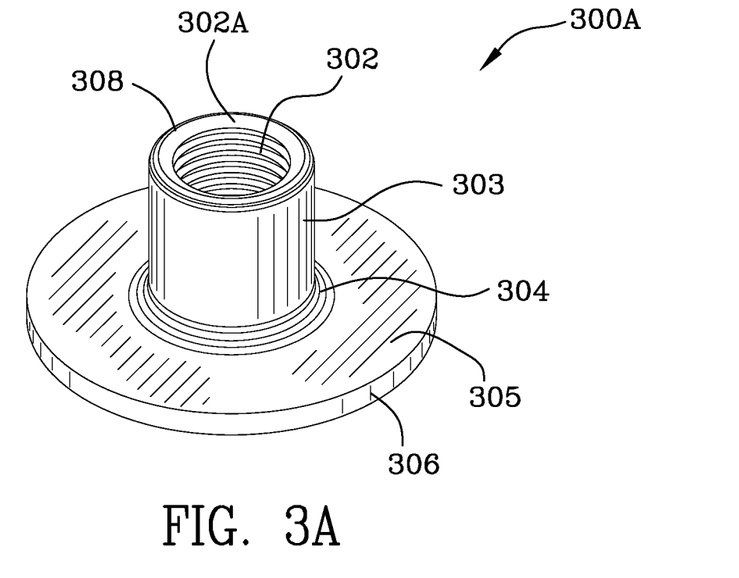
FIG. 3A is a another perspective view of the t-nut threaded completely through the part.
Figure 3B:
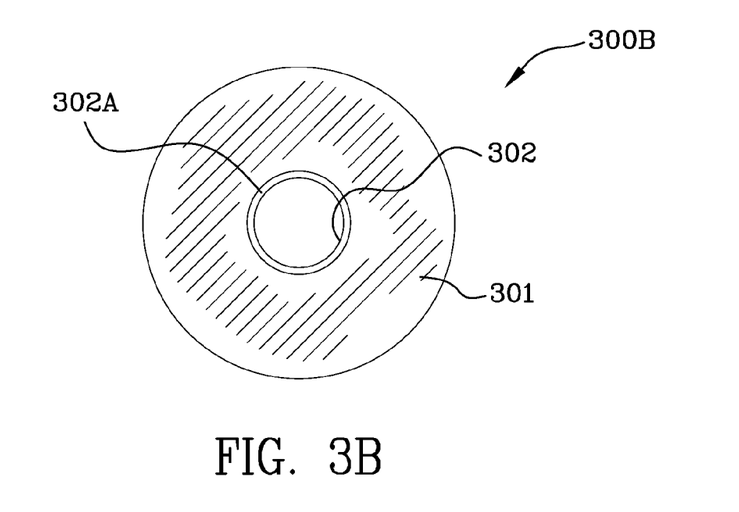
FIG. 3B is a top view of the t-nut with through threads.
Figure 3C:
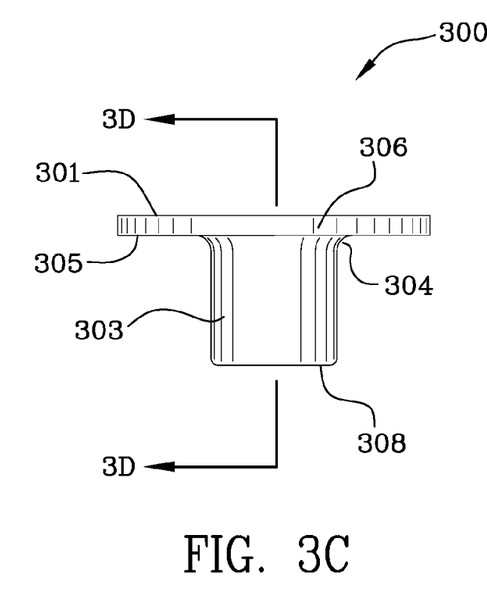
FIG. 3C is a side view of the t-nut with through threads.
Figure 3D:
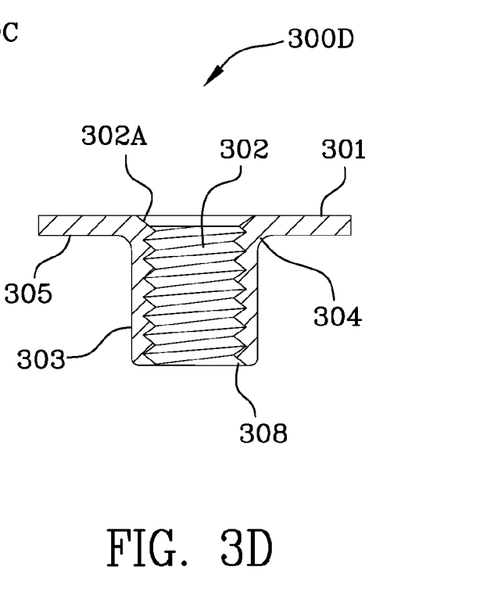
FIG. 3D is a cross-sectional view taken along the lines 3D-3D of FIG. 3C.

FIG. 3 is a top perspective view 300 of a t-nut threaded completely through the part. FIG. 3A is another perspective view 300A of the t-nut threaded 302 completely through the part. FIG. 3B is a top view 300B of the t-nut with through threads. Flange 301 of the t-nut is viewed in both FIGS. 3 and 3A and is generally cylindrically shaped and terminates in a circumferential edge portion 306. T-nuts are manufactured from sheets or slugs of steel (or stainless steel) which is deformed to include a barrel or shank such as that denoted by reference numeral 303. Barrel or shank 303 terminates in an open end portion 308. Shank 303 is cylindrically shaped and includes interior threads 302. Interior threads 302 extend all the way from the opening 302A in the flange to the end portion 308 of the shank 303. Shank 303 transitions in a curved surface 304 into the underside 305 of the flange. FIG. 3C is a side view 300C of the t-nut with through threads. FIG. 3D is a cross-sectional view 300D taken along the lines 3D-3D of FIG. 3C.

Figure 4:
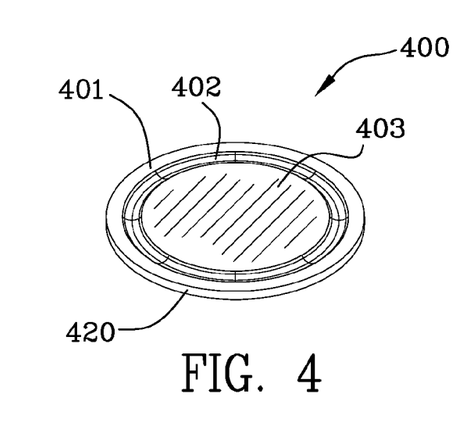
FIG. 4 is a perspective view of the outer portion of the end cap of the invention.
Figure 4A:
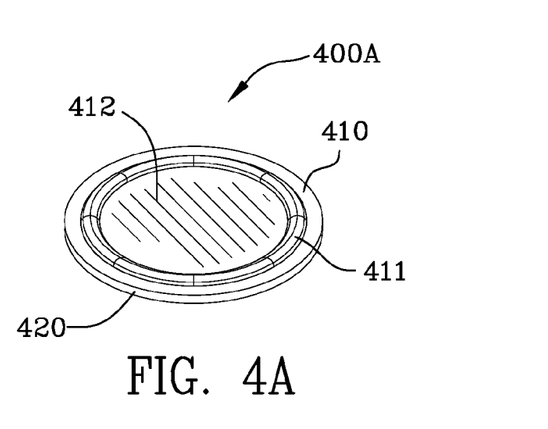
FIG. 4A is a perspective view of the engaging portion of the end cap of the invention with a raised upper lip.
Figure 4B:
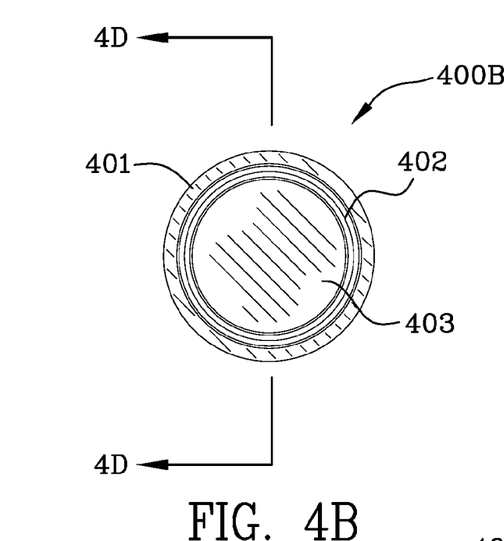
FIG. 4B is a top view of the end cap.
Figure 4C:
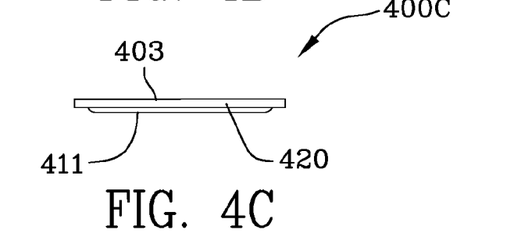
FIG. 4C is a side view of the end cap.
Figure 4D:
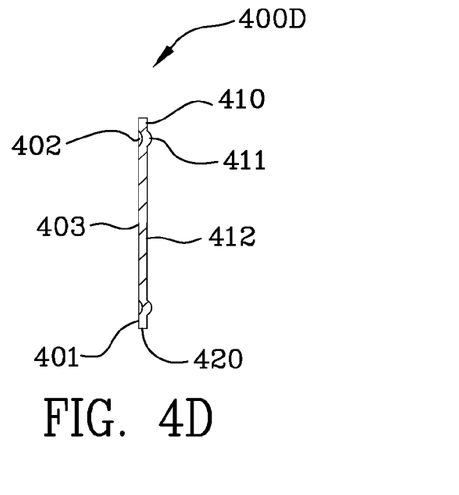
FIG. 4D is a cross-sectional view taken along the lines 4D-4D of FIG. 4B.

FIG. 4 is a perspective view 400 of the outer portion of the end cap of the invention. The end cap may be made of steel or stainless steel. The end cap is generally disc shaped (cylindrically shaped) and terminates in a circumferential edge 420. Outer lip 401 of the end cap is illustrated along with annular recess 402 and outer/center portion 403. FIG. 4A is perspective view 400A of the engaging portion (inner portion) of the end cap of the invention with a raised upper lip 411. Recess 402 is formed in the outer portion of the end cap and creates a corresponding raised lip 411 in the inner portion of the end cap. The ridge can be created by stamping the end cap. FIG. 4B is a top view 400B of the end cap (outer portion of the end cap) with the lip 401, recess 402 and inner/center portion 412 illustrated. FIG. 4C is a side view 400C of the end cap. FIG. 4D is a cross-sectional view 400D taken along the lines 4D-4D of FIG. 4B. Sometimes herein the outer portion of the end cap denoted by the reference numerals 401, 402 and 403 is referred to herein as the first side of the end cap. Additionally, sometimes herein the inner portion of the end cap denoted by the reference numerals 410, 411 and 412 is referred to herein as the second side of the end cap.

Figure 5:
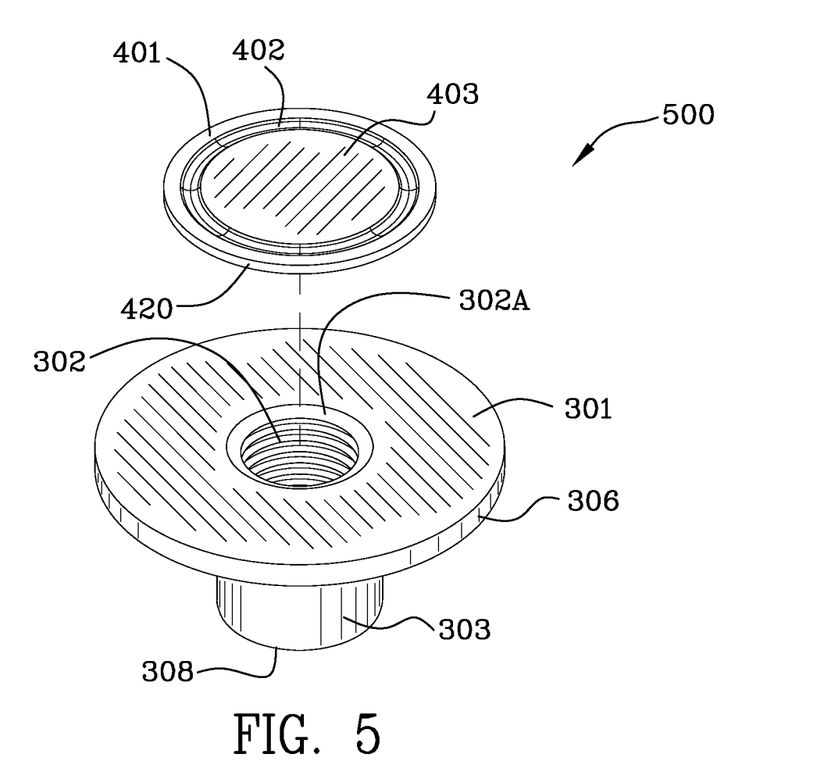
FIG. 5 is an exploded perspective view taken of the end cap and t-nut with through threads.
Figure 5A:
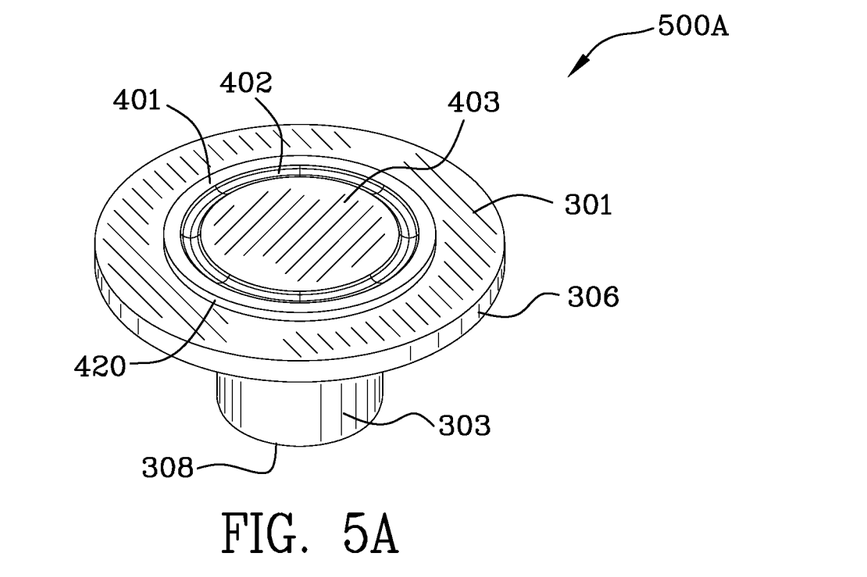
FIG. 5A is a perspective view of the end cap and the t-nut joined together.
Figures 5B, 5C, 5D:
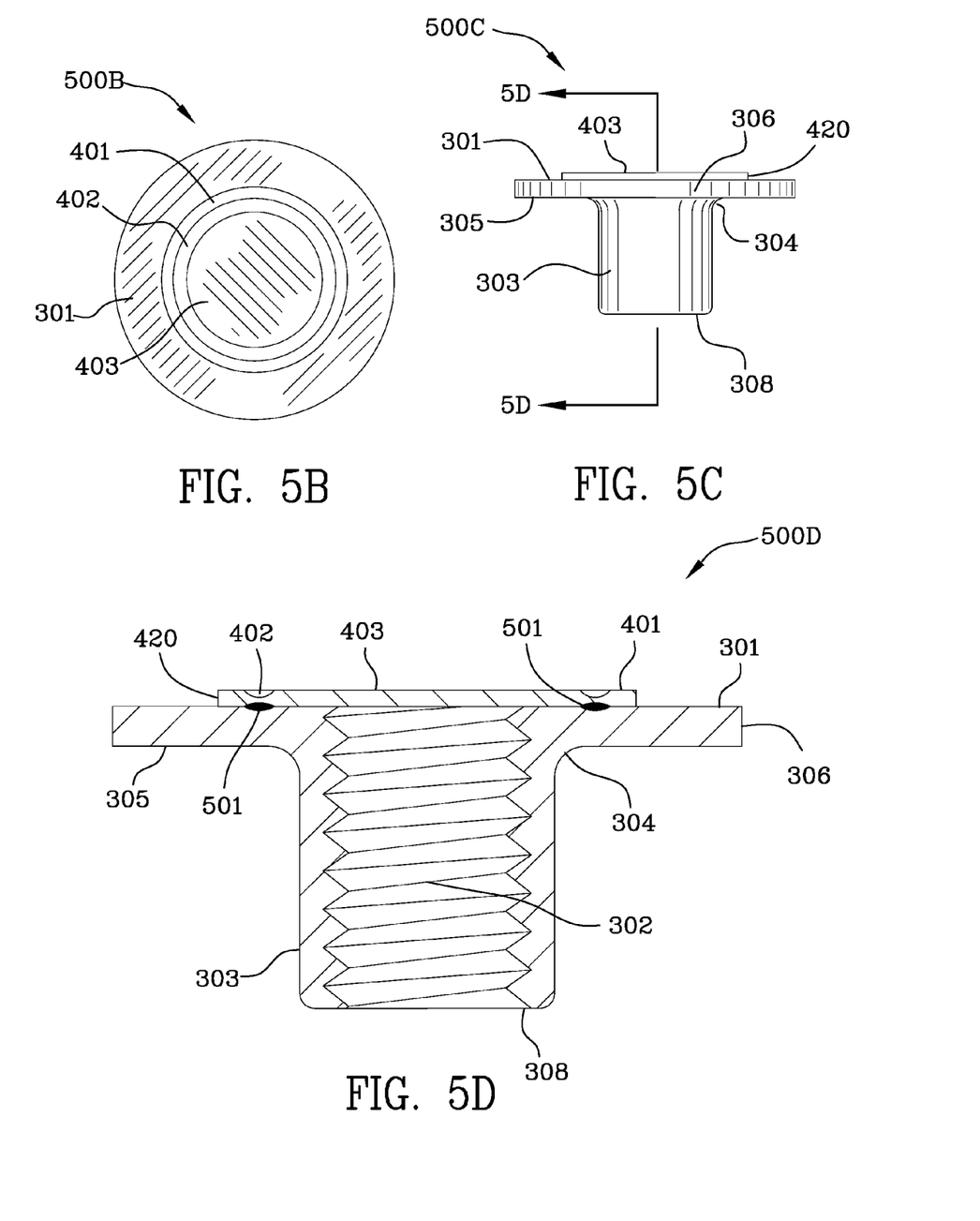
FIG. 5B is an end view of the end cap secured to the t-nut.
FIG. 5C is a front view of the end cap secured to the t-nut.
FIG. 5D is a cross-sectional view taken along the lines 5D-5D of FIG. 5C.

FIG. 5 is an exploded perspective view 500 taken of the end cap and t-nut with interior threads therethrough. It will be noticed that the end cap (denoted generally by reference numerals 401, 402, 403) is aligned concentrically with flange 301 as indicated by the dashed line. FIG. 5A is a perspective view 500A of the end cap (denoted generally by reference numerals 401, 402, 403) and the t-nut (denoted generally by reference numerals 301, 302, 303 and 308) joined together. FIG. 5B is an end view 500B of the end cap secured to the t-nut. FIG. 5C is a front view of the end cap secured to the t-nut. FIG. 5D is a cross-sectional view 500D taken along the lines 5D-5D of FIG. 5C with a circumferential weld 501 joining end cap 401 to the t-nut. The weld is generated by resistance welding wherein a voltage is applied across the end cap and the t-nut. Raised lip 412 on the inner second portion of the end cap is illustrated in FIG. 5 as being essentially flattened or melted to secure and seal the end cap to the t-nut.

Resistance projection welding produces coalescence of metals with the heat obtained from resistance to electrical current through the work parts which are held together under pressure by electrodes. The weld in projection welding is localized at predetermined points by projections. Localized heating is obtained by a projection on one or both of the parts being welded. The projection may be continuous in the form of an annular ring, namely, as the raised portion 411 as illustrated in FIG. 4A. End cap annular projection 411 engages the t-nut under pressure caused by electrodes pushing the end cap and the t-nut together. Electric current is passed through and is focused where the projection engages the t-nut until the projection 411 melts and is fused to the t-nut in a concentric manner. See FIG. 5D.

Figure 10:
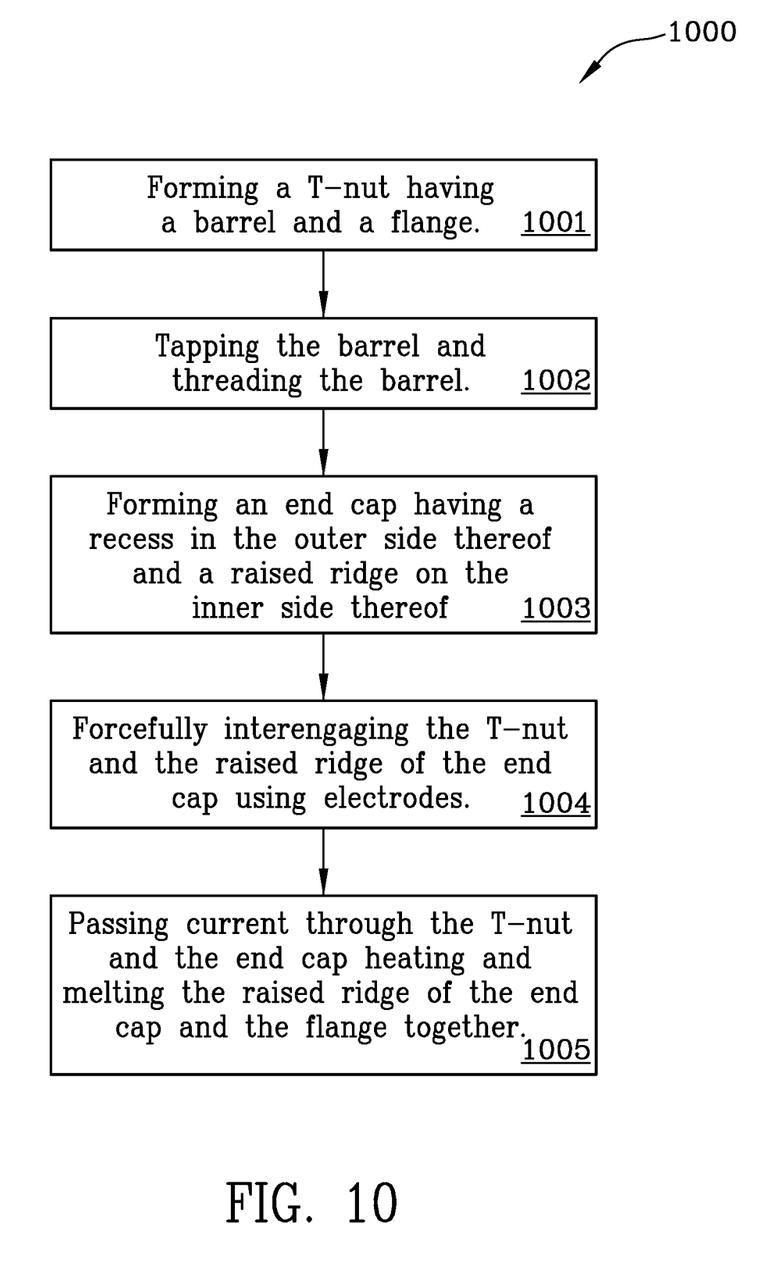
FIG. 10 is a schematic of the steps of the process of making the sealed end t-nut.

FIG. 10 indicates the steps 1000 for making the closed end fastener. The steps include forming a t-nut having a barrel and a flange 1001; tapping the barrel and threading the barrel 1002; forming an end cap having a recess in the outer side thereof and a raised ridge on the inner side thereof 1003, forcefully interengaging the t-nut and the end cap with electrodes 1004; and, passing current through the t-nut and the end cap heating and melting the raised ridge of the end cap and the flange together 1005.

Figure 6:
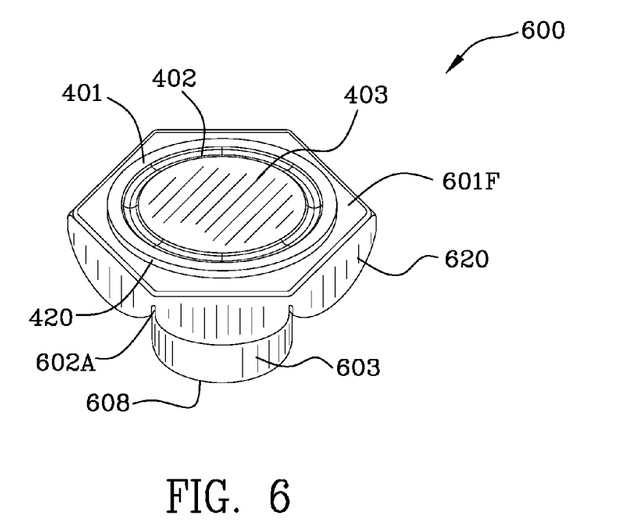
FIG. 6 is a perspective view of an upset hex t-nut and an end cap affixed thereto.
Figure 6A:
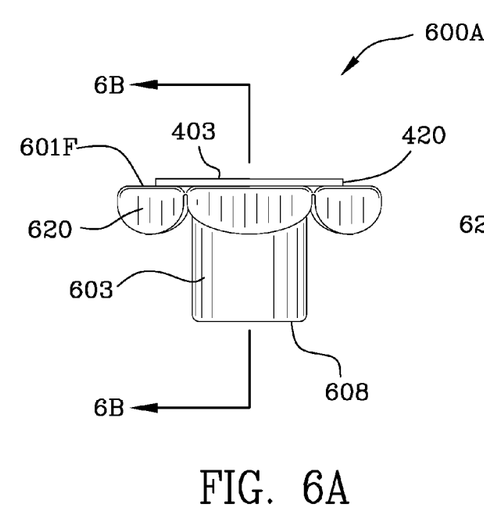
FIG. 6A is a front view of an upset hex and end cap joined thereto.
Figure 6B:
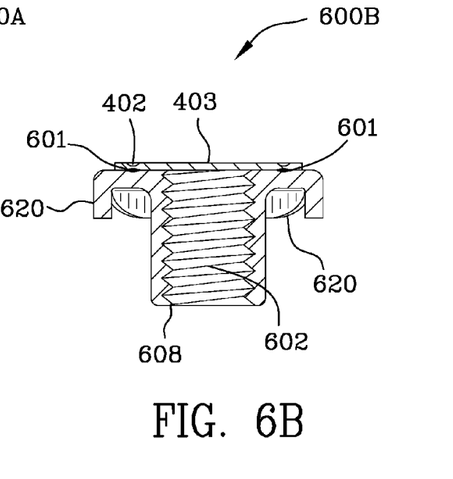
FIG. 6B is a cross-sectional view of the upset hex and end cap illustrated in FIG. 6A taken along the lines 6B-6B.

FIG. 6 is a perspective view 600 of an upset hex t-nut and an end cap (denoted generally by reference numerals 401, 402 and 403) affixed thereto. FIG. 6A is a front view 600A of an upset hex and end cap joined thereto. FIG. 6B is a cross-sectional view 600B of the upset hex and end cap illustrated in FIG. 6A taken along the lines 6B-6B. The weld 601 formed by resistance welding of the end cap to the upset hex nut flange 601F is best illustrated in FIG. 6B and is also implicitly shown in FIGS. 6 and 6A. By implicitly shown, it is meant that the flange and end cap are shown in engagement with no gap therebetween implying a connection therebetween. Flange 601F terminates in edge portions 620. Internally threaded barrel 602 is illustrated in FIG. 6B and shows that threads 602 extend completely therethrough. Slot 602 is illustrated separating the upset edge portions of the upset hex nut flange. Shank 603 of the upset hex nut is viewed in FIGS. 6, 6A and 6B and terminates in end portion 603 of the upset hex nut. Upset edge portions 620 of the upset hex nut are deformed into leaf-like barbs or prongs.

Figure 7:
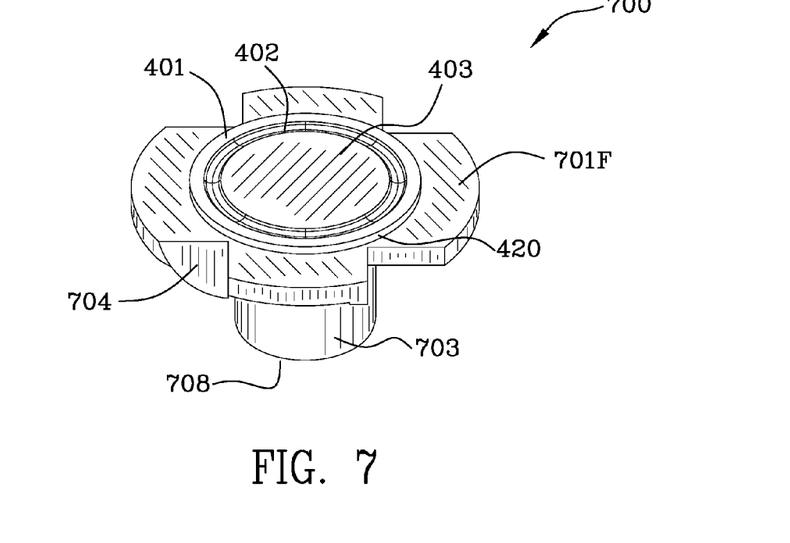
FIG. 7 is a perspective view of a 4-prong t-nut and an end cap affixed thereto.
Figure 7A:
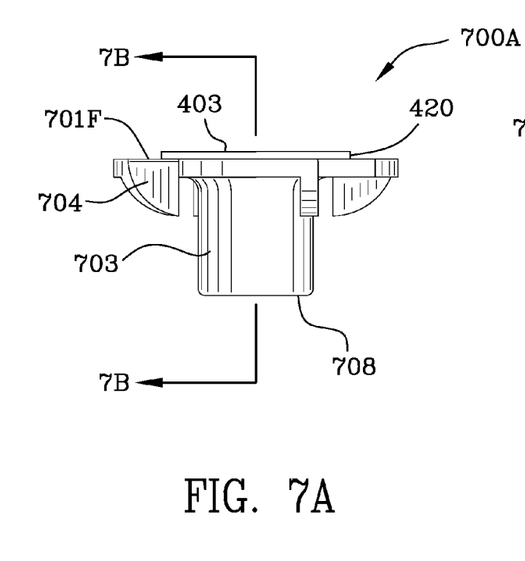
FIG. 7A is a front view of a 4-prong t-nut and end cap joined thereto.
Figure 7B:
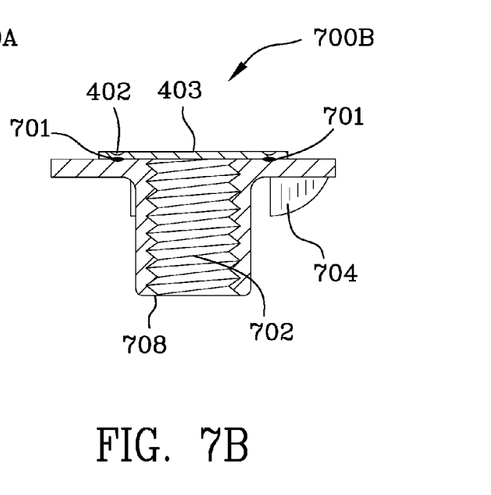
FIG. 7B is a cross-sectional view of a 4-prong t-nut and an end cap illustrated in FIG. 7A taken along the lines 7B-7B.

FIG. 7 is a perspective view 700 of a 4-prong t-nut and an end cap (denoted generally by reference numerals 401, 402 and 403) affixed thereto. Each of the prongs is denoted by reference numeral 704. FIG. 7A is a front view of a 4-prong t-nut and end cap joined thereto. FIG. 7B is a cross-section of a 4-prong t-nut and an end cap illustrated in FIG. 7A taken along the lines 7B-7B. The weld 701 formed by resistance welding of the end cap to the upset hex nut flange 701F is illustrated in FIGS. 7, 7A and 7B. Internally threaded barrel 702 is illustrated in FIG. 7B. Deformed prongs 704 are illustrated extending downwardly from flange 70 IF. Shank 703 of the 4-prong t-nut is viewed in FIGS. 7, 7A and 7B and terminates in end portion 703 of the 4-prong t-nut.

Figure 8:
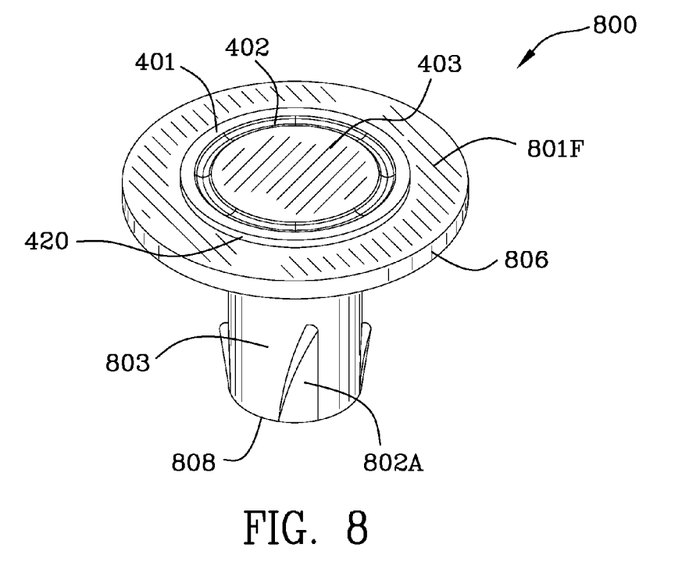
FIG. 8 is a perspective view of a propel nut and an end cap affixed thereto.
Figure 8A:
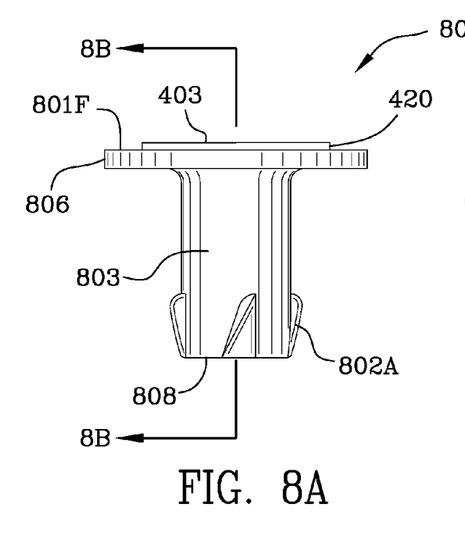
FIG. 8A is a front view of a propel nut and end cap joined thereto.
Figure 8B:
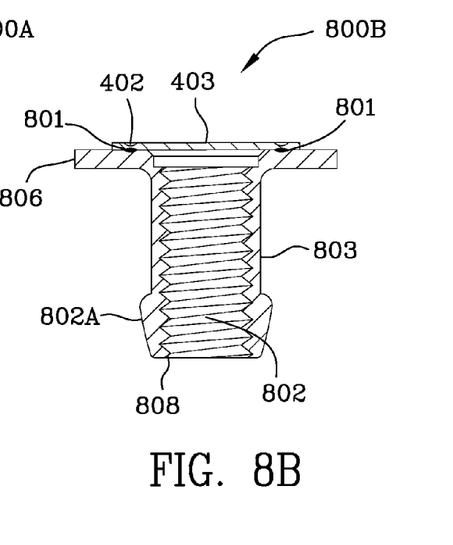
FIG. 8B is a cross-sectional view of a propel nut and an end cap illustrated in FIG. 8A taken along the lines 8B-8B.

FIG. 8 is a perspective view 800 of a propel nut and an end cap affixed thereto. The propel nut includes a shank or barrel 803 having barbs 802 interconnected with flange 801F. FIG. 8A is a front view 800A of a propel nut and end cap joined thereto. FIG. 8B is a cross-sectional view 800B of a propel nut and an end cap illustrated in FIG. 8A taken along the lines 8B-8B. The weld 801 formed by resistance welding of the end cap to the propel nut flange 801F is illustrated in FIG. 8B and is also shown implicitly in FIGS. 8 and 8A wherein there is no gap between the end cap and the flange. By implicitly shown, it is meant that the flange and end cap are shown in engagement with no gap therebetween implying a connection therebetween. FIGS. 8, 8A and 8B illustrate that the flange 801F terminates in edge portions 806. Internally threaded barrel 802 is illustrated in FIG. 8B and shows threads completely through the barrel. Internally threaded barrel 802 is illustrated in FIG. 8B. Deformed prongs 804 are illustrated extending upwardly from the end portion 808. Shank 803 of the propel nut is viewed in FIGS. 8, 8A and 8B and terminates in end portion 808 of the propel nut.

Figure 9:
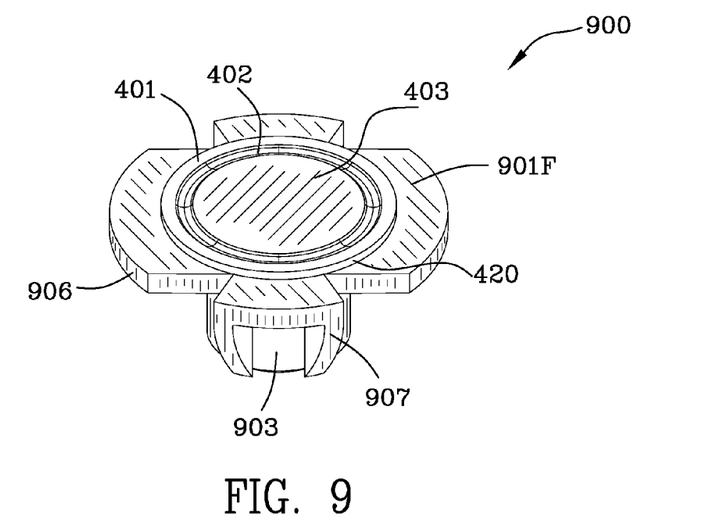
FIG. 9 is a perspective view of a hopper feed nut and an end cap affixed thereto.
Figures 9A, 9B:
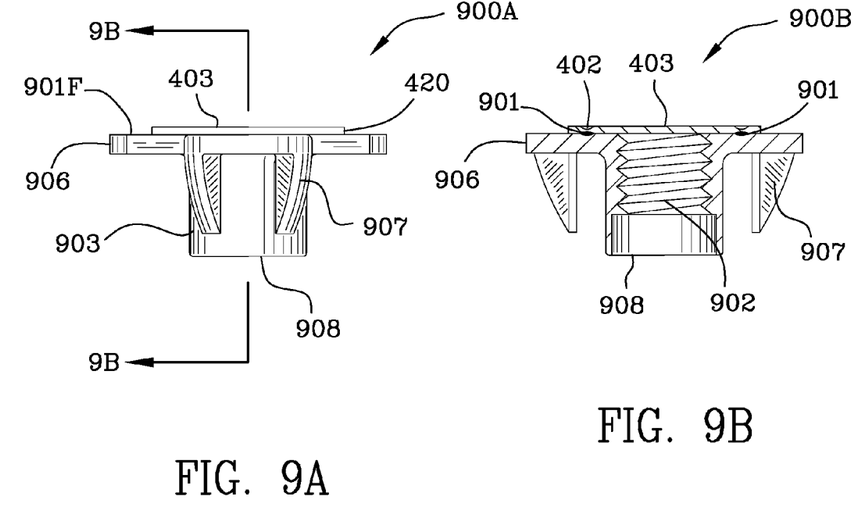
FIG. 9A is a front view of a hopper feed nut and end cap joined thereto.
FIG. 9B is a cross-sectional view of a hopper feed nut and an end cap illustrated in FIG. 9A taken along the lines 9B-9B.

FIG. 9 is a perspective view 900 of a hopper feed nut and an end cap affixed thereto. FIG. 9A is a front view 900A of a hopper feed nut and end cap joined thereto. FIG. 9B is a cross-sectional view 900B of a hopper feed nut and an end cap illustrated in FIG. 9A taken along the lines 9B-9B. The weld 901 formed by resistance welding of the end cap to the hopper feed nut flange 901F is illustrated in FIG. 9B and is also shown implicitly in FIGS. 9 and 9A wherein there is no gap between the end cap and the flange. By implicitly shown, it is meant that the flange and end cap are shown in engagement with no gap therebetween implying a connection therebetween. FIGS. 9, 9A and 9B illustrate that the flange 901F terminates in edge portions 906. Internally threaded barrel 902 is illustrated in FIG. 9B and shows threads completely through the barrel. Internally threaded barrel 902 is illustrated in FIG. 9B. Deformed prongs 907 are illustrated extending downwardly from flange 90 IF. Shank 903 of the hopper feed nut is viewed in FIGS. 9, 9A and 9B and terminates in end portion 908 of the hopper feed nut.

REFERENCE NUMERALS

100—prior art screw machine brass insert.
100A—another view of the prior art screw machine brass insert
101—hexagonal head of the prior art screw machine brass insert
102—tapered recess leading to the threads of the prior art screw machine brass insert
103—inner threads of the prior art screw machine brass insert
104—larger hexagonal head of the prior art screw machine brass insert
105—shank of the prior art screw machine brass insert
200—prior art zinc die cast insert
200A—another view of the prior art zinc die cast insert
201—shank of the prior art zinc die cast insert
202—barb or prong of the prior art zinc die cast insert
203—end or edge of the head of the prior art zinc die cast insert
203F—flange or face of the head of the prior art zinc die cast insert
203T—tapered portion of the head of the prior art zinc die cast insert
203U—underside of the flange
204—inner threads of the prior art zinc die cast insert
205—end of the shank of the prior art zinc die cast insert
300—top perspective view of a t-nut thread all the way through the part
300A—another perspective view of the t-nut with thread all the way through the part
300B—top view of the t-nut with through threads.
300C—side view of the t-nut with through threads.
300D—cross-sectional view taken along the lines 3D-3D of FIG. 3C.
301—flange of the head of the t-nut
302—threads of the t-nut
303—shank of the t-nut
304—radius interconnecting the shank and flange
305—flange
306—circumferential edge of the flange
308—end portion of the shank
400—perspective view of the outer portion of the end cap of the invention 400A—perspective view of the inner portion of the end cap of the invention with a raised upper lip
400B—top view of the end cap
400C—side view of the end cap
400D—cross-sectional view taken along the lines 4D-4D of FIG. 4B
401—lip of the end cap
402—annular recess in outer portion of the cap
403—outer/center portion of the cap
410—inner lip of the end cap
411—raised annular portion of the inside portion of the cap
412—inner/center portion of the cap
420—edge of the cap
500—exploded perspective view taken of the end cap and t-nut with through threads
500A—a perspective view of the end cap and the t-nut joined together
500B—end view of the end cap secured to the t-nut
500C—front view of the end cap
500D—cross-sectional view taken along the lines 5D-5D of FIG. 5C
501—resistance weld of the end cap and the t-nut
600—perspective view of an upset hex t-nut and an end cap affixed thereto
600A—front view of an upset hex nut and end cap joined thereto
600B—cross-section of the upset hex nut and end cap illustrated in FIG. 6A taken along the lines 6B-6B
601—resistance weld of the end cap and the upset hex nut
601*f*—flange
602—threaded portion of the barrel
602A—slot between the upset edge portions of the upset hex nut
603—shank of the upset hex nut
608—end portion of the upset hex nut
620—upset edge portion of the upset hex nut
700—perspective view of a 4-prong t-nut and an end cap affixed thereto
700A—front view of a 4-prong t-nut and end cap joined thereto
700B—cross-sectional view of a 4-prong t-nut and an end cap illustrated in FIG. 7A taken along the lines 7B-7B
701—resistance weld of the end cap and the 4-prong t-nut
701F—flange portion of the 4-prong t-nut
702—threaded barrel
702A—cut portion of the 4-prong t-nut
703—shank of the 4-prong t-nut
704—deformed flap of the 4-prong t-nut
708—end of shank portion
800—perspective view of a propel nut and an end cap affixed thereto
800A—front view of a propel nut and end cap joined thereto
800B—cross-sectional view of a propel nut and an end cap illustrated in FIG. 8A taken along the lines 8B-8B
801—resistance weld of the end cap and the propel nut
801F—flange portion of the propel nut
802—threaded barrel
802A—barb on shank of the propel nut
803—shank of the propel nut
806—edge of the flange of the propel nut
900—perspective view of a hopper feed nut and an end cap affixed thereto
900A—front view of a hopper feed nut and end cap joined thereto
900B—cross-section of a hopper feed nut and an end cap illustrated in FIG. 9A taken along the lines 9B-9B
901—resistance weld of the end cap and the hopper feed nut
901F—flange portion of the hopper feed nut
906—edge of the flange of the hopper feed nut
907—prongs of the hopper feed nut
908—end of barrel
1000—schematic diagram for making the closed end fastener
1001—forming a t-nut having a barrel and a flange
1002—tapping the barrel and threading the barrel
1003—forming an end cap having a recess in the outer side thereof and a raised ridge on the inner side thereof
1004—forcefully interengaging the t-nut and the end cap with electrodes
1005—passing current through the t-nut and the end cap heating and melting the raised ridge of the end cap and the flange together The invention has been set forth by way of example only. Those skilled in the art will readily recognize that changes may be made to the invention without departing from the spirit and scope of the appended claims.

The invention claimed is:

1. A process for making a fastener, comprising the steps of:
    forming a t-nut having a barrel and a flange, said flange includes an opening, said barrel extending from said opening in said flange to a distal end portion;
    forming interior threads in said barrel, said interior threads in said barrel extending substantially from said opening in said flange to said distal end portion of said barrel;
    forming an end cap having an annular recess on a first side thereof and having a raised annular ridge on a second side thereof;
    placing, concentrically, said end cap with respect to said opening of said flange, said end cap extending across said opening of said flange;
    engaging, completely, said annular ridge of said second side of said end cap with said flange; and,
    resistance welding, in an annular pattern, and sealing said raised annular ridge of said end cap to said flange of said t-nut, said end cap completely occluding said barrel.

2. A process for making a fastener as claimed in claim 1 further comprising the step of forming a portion of said flange of said t-nut into six prongs.

3. A process for making a fastener as claimed in claim 1 further comprising the step of forming a portion of said flange of said t-nut into four prongs.

4. A process for making a fastener as claimed in claim 1 further comprising the step of forming barbs on a portion of said barrel of said t-nut creating a propel nut.

5. A process for making a fastener as claimed in claim 1 further comprising the step of forming a portion of said flange of said t-nut into a hopper feed t-nut.

6. A fastener, comprising,
    a t-nut having a barrel and a flange, said flange includes an opening, said barrel extending from said opening in said flange to a distal end portion;
    interior threads in said barrel, said interior threads in said barrel extending substantially from said opening in said flange to said distal end portion of said barrel;
    an end cap having an annular recess on a first side thereof and having a raised annular ridge on a second side thereof;
    said end cap residing concentrically with respect to said opening of said flange, said end cap extending across said opening of said flange;
    engaging, completely, said raised annular ridge of said second side of said end cap with said flange; and,
    said raised annular ridge of said end cap annularly affixed and sealed to said flange of said t-nut, said end cap completely occluding said barrel.

7. A process for making a fastener as claimed in claim 6 wherein said t-nut includes six prongs.

8. A fastener as claimed in claim 6 wherein said t-nut is a four-prong t-nut.

9. A fastener as claimed in claim 6 wherein said t-nut is a propel nut and said barrel includes barbs.

10. A fastener as claimed in claim 6 wherein said t-nut is a hopper feed t-nut.

11. A process for making a fastener, comprising the steps of:
   forming a t-nut having a barrel and a flange, said flange includes an opening, said barrel extending from said opening in said flange to a distal end portion;
   tapping said barrel from said opening in said flange to said distal end portion of said barrel and completely threading said barrel from said opening in said flange to said distal end portion of said barrel;
   forming an end cap having a recess in the outer side thereof and a raised circumferential ridge on the inner side thereof;
   placing, concentrically, said end cap with respect to said opening of said flange, said end cap extending across said opening of said flange,
   engaging, completely, said circumferential ridge of said inner side of said end cap with said flange;
   forcefully interengaging said t-nut and said end cap together with electrodes;
   resistance projection welding said flange of said t-nut and said circumferential ridge of said end cap together passing electrical current through said circumferential ridge and said flange;
   sealing said circumferential ridge of said end cap to said flange in a circumferential pattern; and,
   occluding, completely, said barrel with said end cap.

\* \* \* \* \*

UNITED STATES PATENT AND TRADEMARK OFFICE
CERTIFICATE OF CORRECTION

PATENT NO.        : 8,485,910 B2                                      Page 1 of 1
APPLICATION NO.   : 12/329601
DATED             : July 16, 2013
INVENTOR(S)       : Stephen Selle It is certified that error appears in the above-identified patent and that said Letters Patent is hereby corrected as shown below:

In the Specifications:

Col. 5, line 48, after "flange" delete "70 IF" and insert -- 701F --.

Col. 6, line 21, after "flange" delete "90 IF" and insert -- 901F --.

Signed and Sealed this
Twenty-seventh Day of August, 2013

Teresa Stanek Rea
*Acting Director of the United States Patent and Trademark Office*